May 27, 1947.　　　A. VENDITTY　　　2,421,134
UNIVERSAL JOINT
Filed July 19, 1943　　　2 Sheets-Sheet 2
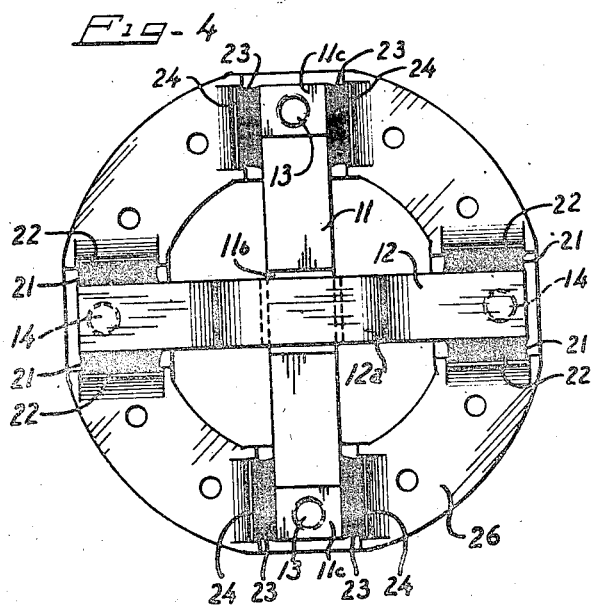
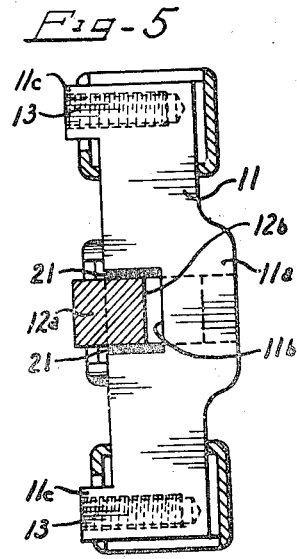
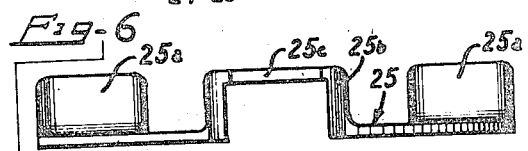
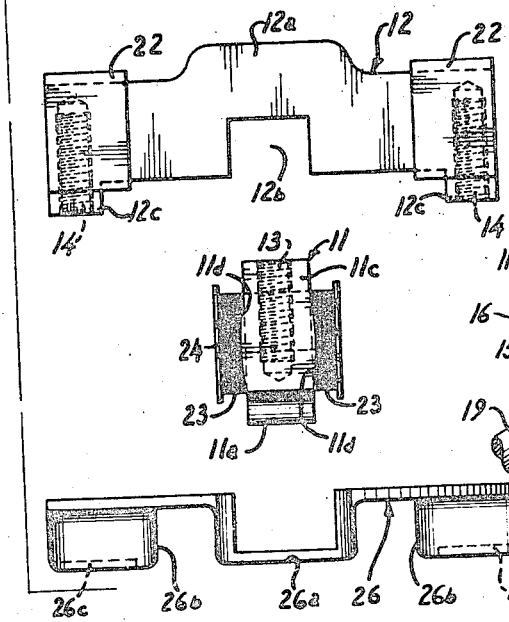
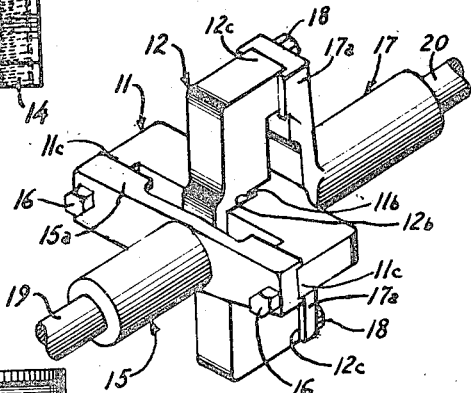
Inventor
ANTHONY VENDITTY
by Patented May 27, 1947

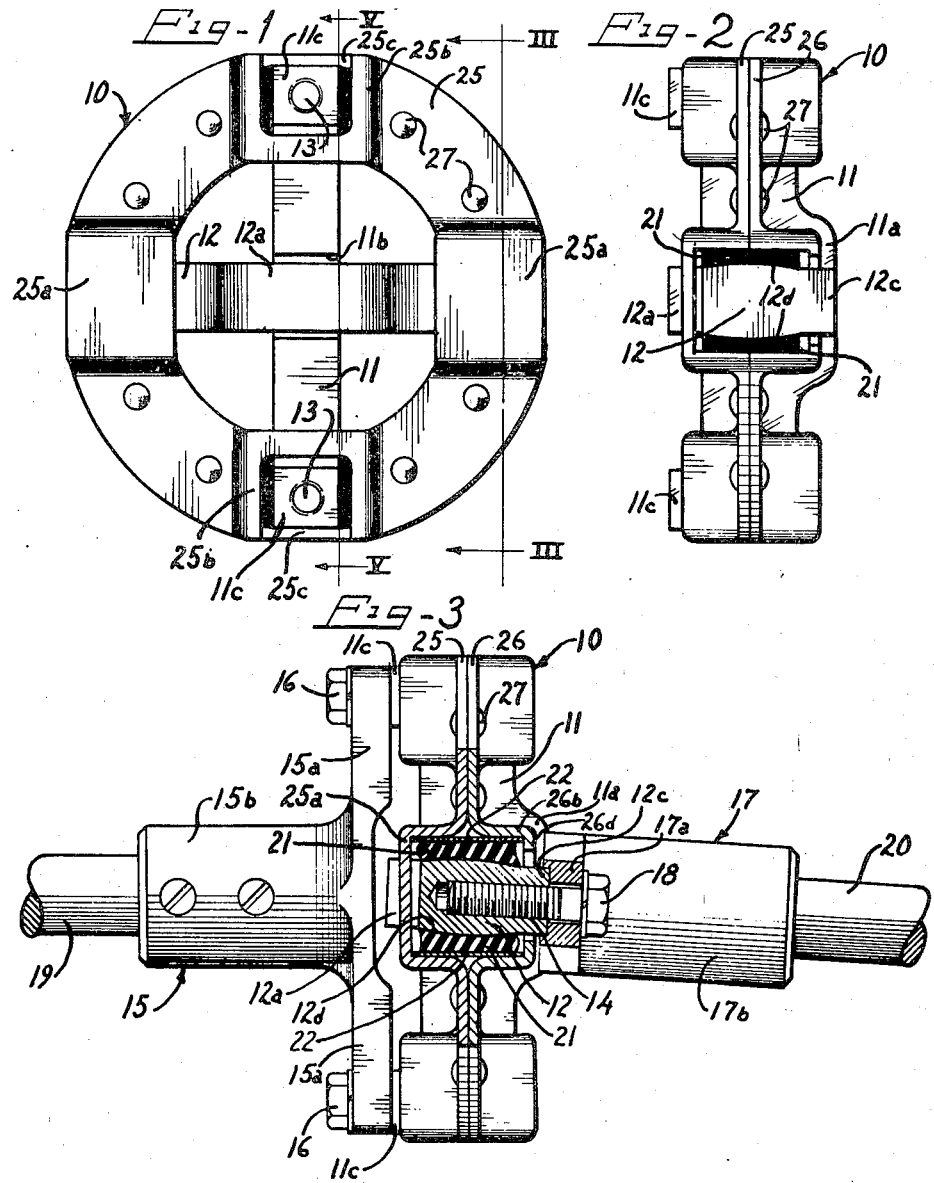

2,421,134

UNITED STATES PATENT OFFICE 2,421,134

UNIVERSAL JOINT

Anthony Venditty, Detroit, Mich., assignor to Thompson Products, Inc., Cleveland, Ohio, a corporation of Ohio Application July 19, 1943, Serial No. 495,244

9 Claims. (Cl. 64—14)

This invention relates to universal joints or couplings wherein crossed links or connecting members are respectively attached to driving and driven members which bridge the crossed portions thereof to provide a chain-like assembly, and wherein an independent housing or torque transmitting member receives the outer ends of the links or connecting members in articulate relation through the means of flat sandwich type resilient bushings.

In accordance with this invention, a pair of link bars having intermediate offset portions providing recesses are crossed at right angles to each other with the intermediate portion of one link seated in the recess of the other link. The recesses of the links are oversize so that the links can move relative to each other. A driven member has a flange secured to the outer ends of one link and bridging the recess of this link. A driving member is opposed to the driven member and has a flange secured to the outer ends of the other link bridging the recess thereof. The flanges of the driving and driven members preferably have keyways therein receiving keys on the ends of the links. These key and keyway connections transmit or carry the torque loads so that bolts or pins used to fasten the flanges to the links are not subjected to shear loads or bending moments. A chain link-like assembly is thus provided.

The outer ends of the links extend into separate pockets of a torque-transmitting ring which is preferably formed from two opposed riveted-together stamped plates each having four offset portions cooperating to provide the four pockets receiving the outer ends of the links. Rubber blocks are interposed or sandwiched between the side faces of the links and the side walls of the pockets of the torque-transmitting ring. These rubber blocks are in the form of independent rubber plates preferably bonded to the opposed side walls of the links along their inner faces and preferably carrying metal plates on their outer faces. The rubber blocks are preferably squeezed into the pockets of the torque-transmitting rings so as to be compressively loaded.

The driving member transmits driving torque to one link which transfers this torque through the rubber blocks and ring to the other set of rubber blocks and other link for driving the driven member.

In the constructions of this invention the rubber blocks are not subjected to shear load because oscillation only works the faces of the rubber blocks. Since the driving and driven members are preferably connected to the outer ends of the links no building up of oscillatory movement through a lever arm advantage occurs as when the driving and driven members are connected to the central portions of radiating arms and when the torque-transmitting housing or ring is directly connected to the driving or driven member.

Even though the rubber blocks fail completely, assembled relation of the coupling will be maintained due to the chain link construction produced by the crossed links and covering flanges of the driving and driven members.

The universal joints or couplings of this invention will accommodate angulation throughout a wide degree and can be made very compact because of the sandwich rubber block arrangement obviating the necessity for large masses of rubber surrounding torque-transmitting members.

It is an object of this invention to provide universal joints or couplings with crossed connecting members or links and independent torque-transmitting housings.

A further object of the invention is to provide a universal joint having crossed connector members directly coupled to driving and driven members for providing a chain-like assembly.

A further object of the invention is to provide a universal joint wherein driving torque is applied to opposed ends of a single connector member and is transmitted through an independent housing to the opposed ends of a single torque load-receiving member.

Another object of the invention is to provide a rubber bushed universal joint which operates to transmit torque load through the rubber bushings without subjecting the bushings to shear load.

A still further object of the invention is to provide a universal joint or coupling wherein torque loads are applied in opposite directions to the ends of a single member to produce rotation of this member for rotating a housing, which housing, in turn, applies torque loads in opposite directions to the ends of an opposed single member thereby resulting in twisting loads on each single member and eliminating heretofore encountered bending loads on fastening or mounting bolts, studs, pins and the like.

Another object of the invention is to provide, in a coupling or joint, key connections between driving and driven single members or links and their respective driving and driven flanges to eliminate shear loads on fastening or mounting bolts, pins, studs or the like.

A still further object of the invention is to provide a very compact coupling or universal joint embodying the use of flat rubber blocks sandwiched between driving and driven members.

Other and further objects of the invention will be apparent to those skilled in the art from the following detailed description of the annexed sheets of drawings which, by way of preferred example only, illustrate one embodiment of the invention:

On the drawings:

Figure 1 is a plan view of a universal joint or coupling according to this invention.

Figure 2 is a side elevational view of the joint shown in Figure 1.

Figure 3 is a view taken along the line III—III of Figure 1 and illustrating the joint of this invention connected to driving and driven members.

Figure 4 is a plan view similar to Figure 1 but with one of the casings removed.

Figure 5 is a cross-sectional view, with parts in elevation, taken along the line V—V of Figure 1.

Figure 6 is an exploded elevational view of the universal joint parts.

Figure 7 is a perspective sub-assembly view illustrating the chain-like assembly provided by the cross links cooperating with the driving and driven members.

As shown on the drawings:

In Figures 1 to 3 inclusive the reference numeral 10 designates generally a universal joint or coupling according to this invention. The universal joint 10 includes a link in the form of a metal bar 11 having an intermediate offset portion 11a providing a recess or well 11b. A second link composed of a metal bar 12 having an intermediate offset portion 12a providing a recess or well 12b, as best shown in Figures 5 and 6, crosses the link 11 with the intermediate portion 11a of the link 11 partially extending into the recess 12b and with the intermediate portion 12a of the link 12 partially extending into the recess 11b of the link 11. The recesses 11b and 12b are wider than the links 11 and 12 so that the links can readily move relative to each other.

The link 11 has raised portions or keys 11c, 11c on the ends thereof projecting from the recessed top thereof. These end portions or keys 11c, 11c are each provided with an internally threaded hole 13. Similarly, the link 12 has end portions or keys 12c, 12c projecting from the top thereof, containing the recess 12b. The ends or keys 12c, 12c are each equipped with an internally threaded hole 14.

As best shown in Figures 3 and 7, a driving member 15 having radial flange arms 15a, 15a extending from a central hub portion 15b has the ends of the arms 15a, 15a equipped with keyways receiving the raised portions or keys 11c, 11c of the link 11. Bolts 16 extend freely through the flange arms 15a and are threaded into the holes 13 of the link. Similarly, a driven member 17 has outturned flange arms such as 17a equipped with keyways on the ends thereof receiving the keys or raised portions 12c of the link 12 and receiving bolts 18 freely therethrough which are threaded into the holes 14 of the link 12. The driven member 17 has a central hub 17b. The central hub 15b of the driving member 15 receives a drive shaft 19. Similarly, the central hub 17b of the driven member 17 receives a driven shaft 20.

The key and keyway connections between the links and flange arms transmit or carry all the torque loads, thereby eliminating shear loads on the bolts 16 and 18 and making possible the free or loose fitting of the bolts in the flange arms as shown in Figure 3. In addition, the torque loads are applied in opposite directions to the ends of single link members resulting in twist load on these members. This eliminates bending loads on the bolts 16 and 18. As a result the bolts merely function as fastening or mounting devices.

As shown in Figure 7, the links 11 and 12 and the driving and driven members 15 and 17 provide a chain-like assembly with the driving and driven members overlying the recesses 11b and 12b of the links. This assembly will always remain in assembled position even though the rubber blocks of the universal joints may fail.

As shown in Figures 2 and 3, the outer ends of the link 12 have the side walls thereof slightly bulged to provide opposed convex bearing faces 12d. As shown in Figure 6, the outer ends of the link 11 have similarly curved opposed side walls providing convex bearing faces 11d, 11d.

The faces 12d have rectangular rubber blocks or plates 21 bonded thereto. Each block 21 has the outer face thereof bonded to a rectangular metal plate 22.

Similarly, the faces 11d of the link 11 have rectangular rubber blocks or plates 23 bonded thereto and covered by rectangular metal plates 24. The plates 24 are bonded to the outer faces of the rubber blocks.

It will be observed that the rubber blocks 21 and 23 cover only opposed side walls of the links 11 and 12 respectively at the outer ends of these links, as best shown in Figure 4. Rubber is not disposed over the tops and bottoms of the links 11 and 12 and as a result of this construction the heretofore encountered large masses of rubber surrounding torque transmitting and torque receiving members in universal joints have been avoided thereby making possible a very compact construction.

As shown in Figure 3, the rounded or convex faces of the links receiving the rubber blocks facilitate relative articulation between the links and during this movement the rubber blocks are only worked with a rolling movement thereby eliminating shear load on the rubber.

The metal plates 22 and 24 covering the rubber blocks 21 and 23 are seated in pockets provided by riveted together opposed torque-transmitting housing rings 25 and 26. The rings 25 and 26 can be stamped from sheet metal and each has four pocket-defining portions spaced equally therearound.

As shown in Figures 1 and 6, the ring 25 has two diametrically opposed open-ended raised portions 25a, each with substantially flat side walls and a closed top wall, together with two other diametrically opposed raised portions 25b with substantially flat side walls. However, the tops of these raised portions 25b are cut out inwardly from the outer ends thereof to provide recesses 25c receiving the raised portions 11c of the link 11. As best shown in Figure 1, these recesses 25c freely receive the raised portions 11c of the link so as not to interfere with movements of the link. The ring 26 is identical with the ring 25 but, as shown in Figure 6, the housings 26a, which have closed bottom walls, are aligned with the housings 25b of the plate 25 which have the recessed top walls. Conversely, the raised portions 26b with the recesses 26c therein are aligned with the raised portions 25a.

The rings 25 and 26 are riveted together intermediate the raised portions thereof as by means of rivets 27 to provide a ringlike housing with pockets receiving the blocks on the ends of the links 11 and 12. As shown in Figure 3, the pockets are each provided by a closed top walled raised portion such as 25a of the plate 25 and an open top walled raised portion such as 26b of the plate 26. The plates such as 22 covering the rubber blocks such as 21 are bottomed on the closed top walls of the pockets such as 25a while the open top walls of the pockets such as 26b have inturned flange portions such as 26d overlying the other ends of the plates 22.

The pockets are somewhat undersize so as to subject the rubber blocks to a compression load.

In operation, the driving member 15 transmits driving torque in opposite directions through key and keyway connections to the opposite ends of the link 11 to rotate the link without applying shear or bending loads to the bolts 16. The rubber blocks 23 transmit the torque load through compression to the housing provided by the rings 25 and 26. This housing is independent of the driven member 17 but transmits the torque through the other set of rubber blocks 21 to the other link 12. The link 12 transmits the driving torque to the flange arms 17a of the driven member 17 and the driven member drives the driven shaft 20.

Since the housing provided by the rings 25 and 26 is entirely independent of the driving and driven members there is no building up of movement in the rubber blocks as these members are articulated. The rubber blocks, of course, accommodate relative movement of the links 11 and 12 to permit the free articulation between the driving and driven members. All driving torque is transmitted through compression load on the rubber blocks, and, since these blocks only cover the sides of the links, undue shearing action on rubber is eliminated.

The articulation between the driving and driven members is readily borne on the working faces of the blocks and, since these faces cooperate with convex rounded faces on the links, a smooth rolling movement occurs in the rubber.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A universal joint comprising crossed links, a driving member bridging the crossing portions of said links secured to one link, a driven member bridging the crossing portions of said links secured to another link, said links and members forming a chain-like assembly, an independent housing receiving said links and resilient blocks between said housing and said links.

2. A universal joint comprising a first link having an intermediate offset portion providing a recess, a second link having an intermediate offset portion providing a second recess, said links being crossed with the offset portions thereof extending into said recesses, a driving member bridging the recess of said first link and secured to the end portions of said first link, a driven member bridging the recess of said second link and secured to the end portions of said second link, said members and links providing a chain-like assembly, a torque transmitting ring receiving the end portions of said links, and rubber blocks between said ring and said end portions of the links mounting said links for articulate movement relative to said ring and to each other.

3. A universal joint comprising a pair of linked-together crossed links in interlocked closed loop relationship, a driving member secured to one link of said pair, a driven member secured to the other link of said pair, an independent housing receiving the outer end portions of said links, and resilient means between said links and said housing.

4. A universal joint or coupling comprising a pair of cross links in interlocked closed loop relationship and having radially extending outer ends, an independent torque-transmitting ring surrounding said links having pockets receiving said outer ends, rubber means in said pockets coacting with said links to drivingly connect the links and rings, a driving member secured to one link, and a driven member secured to the other link.

5. A universal joint or coupling comprising crossed bars, a pair of rubber blocks at the outer ends of each bar, said blocks bonded to opposed side faces of each bar, at the outer ends of each bar, and a torque-transmitting housing having pockets receiving said pairs of rubber blocks.

6. A universal joint or coupling comprising crossed links having opposed convex wall portions at the outer ends thereof, a rubber block bonded to each convex wall portion of each bar, a metal plate covering each rubber block and bonded thereto, and a torque-transmitting ring having pockets with side walls receiving said metal plates thereagainst.

7. A universal joint or coupling comprising a metal ring having two pairs of diametrically opposed pockets, the pockets of one pair having open top walls and closed bottoms, the pockets of the other pair having closed top walls and open bottoms, a pair of crossed links having outer end portions projecting into said pockets, one of said links having raised portions projecting through the open tops of said pockets, the other of said links having raised portions projecting through the open bottoms of said pockets, driving and driven members respectively connected to said raised portions of said links, and rubber blocks sandwiched between said pockets and the sides of said links whereby driving torque from the driving member is transmitted to one link and through the rubber blocks to said ring member and then through the ring member to the other link and driven member.

8. A universal joint or coupling comprising crossed links having keys on the ends thereof, opposed driving and driven members bridging the crossing portions of the links having keyways receiving said keys, means mounting said members on said links, said links and members forming a chain-like assembly, and an independent torque-transmitting housing receiving the ends of said links, said keys and keyways eliminating shear loads on said mounting means.

9. A universal joint or coupling comprising a driving member, a rigid drive bar having outer end portions secured to said driving member for receiving torque in opposite directions, a driven member, a rigid driven bar having outer end portions connected to said driven member for transmitting torque to the driven member in either direction, the connections between said bars and said members subjecting said bars to twist loads, a torque-transmitting ring receiving the outer ends of said bars for connecting the bars in articulate relation, and fastening means free from bending moments respectively securing said bars to said driving and driven members during operation of the joint or coupling.

ANTHONY VENDITTY.

REFERENCES CITED

The following references are of record in the file of this patent:

UNITED STATES PATENTS

| Number | Name | Date |
|---|---|---|
| 1,838,794 | Thiry | Dec. 29, 1931 |
| 1,443,440 | Spicer et al. | Jan. 30, 1923 |
| 2,157,996 | Brownstein | May 9, 1939 |
| 1,861,753 | Peters | June 7, 1932 |
| 1,978,939 | Guy | Oct. 30, 1934 |

FOREIGN PATENTS

| Number | Country | Date |
|---|---|---|
| 607,955 | Germany | Jan. 12, 1935 |
| 484,834 | Great Britain | May 11, 1938 |
| 493,219 | Great Britain | Oct. 5, 1938 |
| 73,483 | Sweden | Jan. 26, 1932 |
| 251,123 | Italy | Dec. 7, 1926 |